(12) United States Patent
Gan et al.

(10) Patent No.: US 11,800,622 B2
(45) Date of Patent: Oct. 24, 2023

(54) LIGHTING CONTROL METHOD, LIGHTING CONTROL DEVICE AND LIGHTING DEVICE

(71) Applicant: SAVANT TECHNOLOGIES LLC, East Cleveland, OH (US)

(72) Inventors: Yuanyaun Gan, Shanghai (CN); Aijun Wang, Shanghai (CN); Liang Shan, Shanghai (CN); Zhiyong Wang, Shanghai (CN); Xiaojun Ren, Shanghai (CN); Casey Klock, Cleveland, OH (US)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 17/956,501

(22) Filed: Sep. 29, 2022

(65) Prior Publication Data
US 2023/0097098 A1    Mar. 30, 2023

(30) Foreign Application Priority Data
Sep. 30, 2021 (CN) .......................... 202111166471.6

(51) Int. Cl.
*H05B 47/16* (2020.01)
*H05B 45/10* (2020.01)
(Continued)

(52) U.S. Cl.
CPC ............. *H05B 47/16* (2020.01); *F21V 5/007* (2013.01); *H05B 45/10* (2020.01); *H05B 45/20* (2020.01);
(Continued)

(58) Field of Classification Search
CPC ........ H05B 47/16; H05B 45/10; H05B 45/20; F21V 5/007; F21Y 2113/17; F21Y 2115/10; F21Y 2113/13; F21K 9/232; Y02B 20/40
See application file for complete search history.

(56) References Cited

U.S. PATENT DOCUMENTS 5,056,399 A    10/1991  Hornstein
6,016,038 A     1/2000  Mueller et al.
(Continued)

FOREIGN PATENT DOCUMENTS

CN        203327328 U    12/2013
CN        104023433 B     1/2016

OTHER PUBLICATIONS

"Custom Cool™ Lava® Lamp Archives." Lava® Lamp, Schylling Inc. , 2022, https://www.lavalamp.com/product-category/custom-cool-lava-lamp/, 3 pages.
(Continued)

*Primary Examiner* — Minh D A
(74) *Attorney, Agent, or Firm* — WOODD IP LLC

(57) ABSTRACT

Disclosed is a lighting control method and a lighting control device for a light source having LEDs, and a lighting device and includes acquiring the number of LEDs and a control curve for controlling changes in brightness and color of the light emitted from each LED over time, the control curve defines the same brightness cycle and color cycle for each LED, the brightness cycle indicates a brightness period and a brightness curve of the change in brightness over time within each period, determining a time offset on the control curve according to the number of LEDs and the brightness change period, determining the starting timings of the remaining LEDs on the control curve according to the starting timing of the first LED and the time offset, and
(Continued)

controlling each LED from the starting timing on the control curve, to emit light according to the brightness and color determined.

22 Claims, 10 Drawing Sheets

(51) Int. Cl.
    *F21V 5/00*         (2018.01)
    *H05B 45/20*      (2020.01)
    *F21Y 113/17*     (2016.01)
    *F21Y 115/10*     (2016.01)

(52) U.S. Cl.
    CPC ........ *F21Y 2113/17* (2016.08); *F21Y 2115/10* (2016.08)

(56) References Cited

U.S. PATENT DOCUMENTS

| | | |
|---|---|---|
| 8,422,889 B2 | 4/2013 | Jonsson |
| 9,433,066 B2 | 8/2016 | Burkhart |
| 9,794,999 B2 * | 10/2017 | Lee ................... H05B 45/395 |
| 10,094,532 B2 | 10/2018 | Houston |
| 10,154,560 B2 | 12/2018 | Nolan et al. |
| 10,201,057 B2 | 2/2019 | Nolan et al. |
| 10,627,062 B2 | 4/2020 | Chen |
| 10,701,778 B2 | 6/2020 | Nolan et al. |
| 10,795,408 B2 | 10/2020 | Hunter et al. |
| 11,041,596 B1 | 6/2021 | Zhang |
| 2020/0288548 A1 | 9/2020 | Ndione et al. |
| 2020/0291058 A1 * | 9/2020 | Sun ......................... A61P 5/46 |
| 2021/0041093 A1 | 2/2021 | Gammons et al. |
| 2021/0307139 A1 * | 9/2021 | Green ................. H05B 47/11 |

OTHER PUBLICATIONS

Galaxy Light Projector for Bedroom | Galaxycove™ Projector GALAXYCOVE, 2022, https://galaxycove.com/products/galaxy-projector, 8 pages.

* cited by examiner (a)

(b)

(c)

(a)

(b)

LIGHTING CONTROL METHOD, LIGHTING CONTROL DEVICE AND LIGHTING DEVICE

CROSS-REFERENCE TO RELATED APPLICATIONS

This application claims the benefit of Chinese Patent Application Serial Number 202111166471.6, filed Sep. 30, 2021, which is herein incorporated by reference.

DESCRIPTION

Field of Technology

The present application relates to the field of lighting, in particular relates to a lighting control method for emitting desired gradually changing light, a lighting control device, and a lighting device including the same.

Background

With the increase in consumer demands, LED illuminating apparatuses capable of realizing light with gradually changing colors have occurred at present. However, the existing illuminating apparatuses, more specifically a single lighting device (such as a bulb) in the illuminating apparatus, can only emit light of one color at a same time, such that the gradually changing light on the bulb is merely limited to the gradual change for a single color, and simultaneous gradual change of a plurality of colors cannot be realized. Moreover, the gradually changing light of the current illuminating apparatus also shows a jump change when changing, and thus it is difficult to provide excellent visual experience.

In view of this, it is required to provide a lighting control method, a lighting control device, and a lighting device including the same, which can realize a desired gradually changing lighting effect for a plurality of colors on the bulb shell of a single bulb.

SUMMARY

The main purpose of the present application is to provide a lighting control method, a lighting control device and a lighting device including the same, so as to at least solve the problem that it is difficult to realize a desired gradually changing lighting effect with a plurality of colors on the bulb shell of a single lighting body in the prior art.

In order to realize the above purpose, according to one aspect of the present application, provided is a lighting control method for a light source having a plurality of LEDs, and the method including: acquiring the number N of LEDs and a control curve for controlling changes in brightness and color of the light emitted from each LED with a time t, the control curve defining the same brightness cycle and color cycle for each LED, wherein the brightness cycle indicates a brightness change period T of the LED and a brightness change curve of the change in brightness with the time t within each brightness change period, and the color cycle indicates a color change period T, the number M of color intervals and a color change curve of the change in color with the time t within each color change period, $M \geq 2$, and $T=MT$; determining a time offset on the control curve according to the number N and the brightness change period T; acquiring a starting timing $t_1$ of the first LED on the control curve, $0 \leq t_1 < MT$; determining a starting timing $t_n$ of the nth LED on the control curve according to the starting timing $t_1$ of the first LED and the time offset: $t_n = t_1 + \text{offset} \times (n-1)$, $n=2, 3, \ldots, N$, so as to determine the starting timing of each LED on the control curve, wherein $0 \leq t_n < MT$, and the starting timings of the N LEDs are different from each other; determining, from the control curve, starting brightness and a starting color corresponding to the starting timing of each LED, based on the starting timing of each LED; and controlling each LED of the plurality of LEDs, beginning from the corresponding starting brightness and starting color, to emit light according to the brightness and color determined by the control curve, wherein within a brightness change period, the brightness first decreases linearly from the highest brightness to the lowest brightness, and then increases linearly from the lowest brightness until returning to the highest brightness, and within a color change period, the color gradually changes in the M color intervals, and the color that corresponds to the timing corresponding to the highest brightness on the control curve is a preset specific color.

In this way, it is possible to emit multi-color gradually changing light with both gradually changing color and brightness from the light source, and multi-color gradually changing light with both gradually changing color and brightness is formed on a bulb shell that covers the light source, thereby providing a desired lighting atmosphere and creating a comfortable entertainment atmosphere.

Further, the determining the time offset on the control curve includes: calculating an initial value of the offset according to $\text{offset}=(\min(N, M)-0.4) \times T/(N-1)$; and adjusting the initial value of the offset according to the relationship between the calculated initial value of the offset and the brightness change period T, so as to derive a final value of the offset, such that the final value of the offset deviates from 0, 0.5T or 1T by more than 0.1T.

In this way, it is possible to avoid excessive brightness differences between adjacent LEDs caused by simultaneous changes or reverse changes in the brightness of the plurality of LEDs, thereby facilitates realizing a gradually changing light effect in which the brightness between the plurality of LEDs also gradually change at any one timing.

Further, the adjusting the initial value of the offset according to the relationship between the calculated initial value of the offset and the brightness change period T, so as to derive the final value of the offset includes: determining whether the initial value of the offset is in an interval [0T, 0.2T], [0.4T, 0.5T], [0.5T, 0.6T], or [0.8T, 1.2T], and when it is determined that the initial value of the offset is in the interval [0T, 0.2T], deriving the final value of the offset as 0.2T; when it is determined that the initial value of the offset is in the interval [0.4T, 0.5T], deriving the final value of the offset as 0.4T; when it is determined that the initial value of the offset is in the interval [0.5T, 0.6T], deriving the final value of the offset as 0.6T; when it is determined that the initial value of the offset is in the interval [0.8T, 1.2T], deriving the final value of the offset as 0.8T; and when it is determined that the initial value of the offset is not in the interval [0T, 0.2T], [0.4T, 0.5T], [0.5T, 0.6T] and [0.8T, 1.2T], deriving the final value of the offset as the calculated initial value of the offset.

In this way, it is possible to avoid excessive brightness differences between adjacent LEDs caused by simultaneous changes or reverse changes in the brightness of the plurality of LEDs, thereby facilitates realizing a gradually changing brightness effect.

Further, the highest brightness is preset 100% brightness, and the lowest brightness is 0.

In this way, it is possible to make each LED present a significant intensity change in brightness over time when emitting light, thereby presenting a desired lighting effect with gradually changing brightness.

Further, within the brightness change period during which the time t changes from 0 to T, in the brightness change curve, the brightness is the preset 100% brightness when t=0m, then the brightness decreases linearly over time until it becomes 0 when t=T/2, and then the brightness increases linearly over time until it returns to the 100% brightness when t=T.

In this way, it is possible to realize a desired brightness change period, thereby realizing the brightness cycle of each LED.

Further, the gradual change means that when the color gradually changes from the interval of the current color to the interval of the next color, the purity of the current color decreases linearly, and at the same time, the purity of the next color increases linearly.

In this way, when the color gradually changes, smooth color transition can be realized, such that the emitted light can realize a desired gradual change in color.

Further, M=6, and the M color intervals are respectively: a red interval, an orange interval, a yellow interval, a cyan interval, a blue interval and a purple interval.

In this way, when going from one color change period to the next color change period, the change in color is also gradual. Therefore, a gradually changing color cycle is realized.

Further, the preset specific color includes M specific colors belonging to different color intervals from each other, each of the M specific colors is defined as a color with a purity of 100% in the color interval to which it belongs, and wherein within the color change period during which the time t changes from 0 to 6T, in the color change curve, the gradual change of the color in the M color intervals includes: the color is red with the purity of 100% when t=0, then the red with the purity of 100% gradually changes to orange until the color is orange with the purity of 100% when t=T, then the orange with the purity of 100% gradually changes to yellow until the color is yellow with the purity of 100% when t=2T, then the yellow with the purity of 100% gradually changes to cyan until the color is cyan with the purity of 100% when t=3T, then the cyan with the purity of 100% gradually changes to blue until the color is blue with the purity of 100% when t=4T, then the blue with the purity of 100% gradually changes to purple until the color is purple with the purity of 100% when t=5T, then the purple with the purity of 100% gradually changes to red until the color returns to red with the purity of 100% when t=6T.

In this way, it is possible to realize a gradual change in color and brightness at the same time, and each LED can present bright-colored light with high saturability after every period of time (for example, T) during the gradual change process of light, thereby realizing an excellent lighting effect in which the color cycles between high saturability and low saturability and cycles between brightness and darkness.

Further, within a color change period, the color gradually changes in the M color intervals in the order of spectral wavelengths corresponding to the M color intervals from large to small or from small to large.

In this way, it is possible to realize a desired and natural gradual change in color in the M color intervals in the order of the spectral wavelengths from large to small or from small to large. When each LED emits light according to the same specified direction (for example, in the order of the red interval, the orange interval, the yellow interval, the cyan interval, the blue interval and the purple interval), it can be ensured that light with gradually changing color and without skipping change is always emitted.

Further, each LED includes a plurality of sub-LEDs that are the same as each other, and at any timing, the lighting color and lighting brightness of the plurality of sub-LEDs in one LED are the same.

In this way, each LED can be a group of sub-LEDs composed of a plurality of sub-LEDs. Therefore, it is possible to arbitrarily expand the number of sub-LEDs (for example, RGB LEDs) included in the light source according to actual demands, so as to provide desired lighting brightness and/or a desired lighting range.

According to another aspect of the present application, further provided is a lighting control device for a light source having a plurality of LEDs. The lighting control device includes: an acquisition module configured to: acquire the number N of LEDs and a control curve for controlling changes in brightness and color of the light emitted from each LED with a time t, the control curve defining the same brightness cycle and color cycle for each LED, wherein the brightness cycle indicates a brightness change period T of the LED and a brightness change curve of the change in brightness with the time t within each brightness change period, and the color cycle indicates a color change period T', the number M of color intervals and a color change curve of the change in color with the time t within each color change period, M$\geqslant$2, and T'=MT, and acquire a starting timing t1 of the first LED on the control curve, 0$\leqslant$t1<MT; a determination module configured to: determine a time offset on the control curve according to the number N and the brightness change period T from the acquisition module, determine the starting timing tn of the nth LED on the control curve according to the time offset and the starting timing t1 of the first LED from the acquisition module: tn=t1+offset×(n−1), n=2, 3, . . . , N, so as to determine the starting timing of each LED on the control curve, wherein 0 $\leqslant$ tn<MT, and the starting timings of the N LEDs are different from each other, and determine, from the control curve, starting brightness and a starting color corresponding to the starting timing of each LED, based on the starting timing of each LED; and a control module configured to: control each LED of the plurality of LEDs, beginning from the corresponding starting brightness and starting color, to emit light according to the brightness and color determined by the control curve, wherein within a brightness change period, the brightness first decreases linearly from the highest brightness to the lowest brightness, and then increases linearly from the lowest brightness until returning to the highest brightness; and within a color change period, the color gradually changes in the M color intervals, and the color that corresponds to the timing corresponding to the highest brightness on the control curve is a preset specific color.

In this way, it is possible to emit multi-color gradually changing light with both gradually changing color and brightness from the light source, and multi-color gradually changing light with both gradually changing color and brightness is formed on a bulb shell that covers the light source, thereby providing a desired lighting atmosphere and creating a comfortable entertainment atmosphere.

Further, the determination module determining the time offset on the control curve includes: calculating an initial value of the offset according to offset=(min(N, M)−0.4)×T/(N−1); and adjusting the initial value of the offset according to the relationship between the calculated initial value of the offset and the brightness change period T, so as to derive a final value of the offset, such that the final value of the offset deviates from 0, 0.5T or 1T by more than 0.1T.

In this way, it is possible to avoid excessive brightness differences between adjacent LEDs caused by simultaneous changes or reverse changes in the brightness of the plurality of LEDs, thereby facilitates realizing a gradually changing light effect in which the brightness of the plurality of LEDs also gradually changes at any one timing.

Further, the adjusting the initial value of the offset according to the relationship between the calculated initial value of the offset and the brightness change period T, so as to derive the final value of the offset includes: determining whether the initial value of the offset is in an interval [0T, 0.2T], [0.4T, 0.5T], [0.5T, 0.6T], or [0.8T, 1.2T], and when it is determined that the initial value of the offset is in the interval [0T, 0.2T], deriving the final value of the offset as 0.2T; when it is determined that the initial value of the offset is in the interval [0.4T, 0.5T], deriving the final value of the offset as 0.4T; when it is determined that the initial value of the offset is in the interval [0.5T, 0.6T], deriving the final value of the offset as 0.6T; when it is determined that the initial value of the offset is in the interval [0.8T, 1.2T], deriving the final value of the offset as 0.8T; and when it is determined that the initial value of the offset is not in the interval [0T, 0.2T], [0.4T, 0.5T], [0.5T, 0.6T] and [0.8T, 1.2T], deriving the final value of the offset as the calculated initial value of the offset.

In this way, it is possible to avoid excessive brightness differences between adjacent LEDs caused by simultaneous changes or reverse changes in the brightness of the plurality of LEDs, thereby facilitates realizing a gradually changing brightness effect.

Further, the highest brightness is preset 100% brightness, and the lowest brightness is 0.

In this way, it is possible to make each LED present a significant intensity change in brightness over time when emitting light, thereby presenting a desired lighting effect with gradually changing brightness.

Further, within the brightness change period during which the time t changes from 0 to T, in the brightness change curve, the brightness is the preset 100% brightness when t0m, then the brightness decreases linearly over time until it becomes 0 when t=T/2, and then the brightness increases linearly over time until it returns to the 100% brightness when t=T.

In this way, it is possible to realize a desired brightness change period, thereby realizing the brightness cycle of each LED.

Further, the gradual change means that when the color gradually changes from the interval of the current color to the interval of the next color, the purity of the current color decreases linearly, and at the same time, the purity of the next color increases linearly.

In this way, when the color gradually changes, smooth color transition can be realized, such that the emitted light realizes a desired gradual change in color.

Further, the spectral wavelengths corresponding to the M color intervals are continuous.

In this way, when the color of the light gradually changes in the M color intervals in the order of the spectral wavelengths corresponding to the M color intervals from large to small, the color of the light gradually changes in each color interval, and also gradually changes between adjacent color intervals, thereby ensuring an excellent gradually changing light effect.

According to yet another aspect of the present application, further provided is a lighting device, including: the abovementioned lighting control device, and a light source having a plurality of LEDs.

In this way, it is possible to emit multi-color gradually changing light with both gradually changing color and brightness from the light source, and multi-color gradually changing light with both gradually changing color and brightness is formed on a bulb shell that covers the light source, thereby providing a desired lighting atmosphere to create a comfortable entertainment atmosphere.

Further, the light source includes: a light source assembly, including the plurality of LEDs, and a lens assembly, including a plurality of lenses, and each of the plurality of lenses is located on a corresponding one of the plurality of LEDs.

In this way, each lens can transmit the light emitted from the corresponding LED to the outside through a corresponding specific lighting area on the bulb shell, and while diffusing a light beam emitted from the LED, the lens can also avoid color confusion caused by the overlapping of the light emitted from the various LEDs.

Further, the lighting device further includes: a bulb shell, which surrounds the light source and transmits the light emitted from the light source to the outside after diffuse reflection, wherein each lens transmits the light emitted from a corresponding LED to the outside through a corresponding lighting area on the bulb shell, and on the bulb shell, two adjacent lighting areas corresponding to two adjacent LEDs are separated from each other or are partially overlapped with each other.

In this way, it is possible to limit the light emitted from the corresponding LED to the specific lighting area on the bulb shell by using the lens, so as to avoid the confusion of the light emitted from different LEDs, which is conducive to realizing an excellent gradually changing light effect, such that a user can observe a desired gradually changing light effect on the bulb shell.

Further, the lighting control device and the light source are integrated in a single housing or are arranged separately from each other.

In this way, it is possible to freely set an independent lighting device in which the lighting control device is integrated with the light source, or set a distributed lighting device. In the distributed lighting device, one lighting control device can be connected to different light sources and independently control each light source to emit multi-color gradually changing light with both gradually changing color and brightness.

Further, the lighting device is a single LED bulb.

In this way, a small and independent LED bulb can be provided, and it is convenient for the user to directly replace the traditional bulb with the LED bulb without using additional components or performing additional settings.

According to still another aspect of the present application, further provided is a lighting device, including: a light source, including: a light source assembly, including a plurality of LEDs, and a lens assembly, including a plurality of lens, wherein each of the plurality of lenses is located on a corresponding one of the plurality of LEDs, and a bulb shell, configured to surround the light source and transmit the light emitted from the light source to the outside after diffuse reflection, wherein the brightness of the light emitted from each LED changes cyclically according to the same brightness change period, the color of the light emitted from each LED changes cyclically according to the same color change period, and the brightness and/or color of the plurality of LEDs are different from each other at any timing.

In this way, it is possible to emit multi-color gradually changing light with both gradually changing color and brightness from the light source of the lighting device, and multi-color gradually changing light with both gradually changing color and brightness is formed on the bulb shell that covers the light source, thereby providing a desired lighting atmosphere to create a comfortable entertainment atmosphere.

Further, for each LED, the color change period is several times the brightness change period, within a brightness change period, the brightness first decreases linearly from the highest brightness to the lowest brightness, and then increases linearly from the lowest brightness until returning to the highest brightness, and within a color change period, the color gradually changes in a plurality of color intervals, and the color corresponding to the highest brightness is a preset specific color.

In this way, each LED can realize a periodic gradual change in the intensity of the lighting brightness, and can also realize a periodic gradual change in the lighting color in the plurality of color intervals, so as to realize a double periodic gradual change in the color and brightness of a single LED, and then desired multi-color gradually changing light with both gradually changing color and brightness is formed on the bulb shell of the lighting device.

Further, each lens transmits the light emitted from a corresponding LED to the outside through a corresponding lighting area on the bulb shell, and on the bulb shell, two adjacent lighting areas corresponding to two adjacent LEDs are separated from each other or are partially overlapped with each other.

In this way, it is possible to limit the light emitted from the corresponding LED to the specific lighting area on the bulb shell by using the lens, so as to avoid the confusion of the light emitted from different LEDs, which is conducive to realizing an excellent gradually changing light effect.

Further, each LED includes a plurality of sub-LEDs that are the same as each other, and at any timing, the lighting color and lighting brightness of the plurality of sub-LEDs in one LED are the same.

In this way, each LED can be a group of sub-LEDs composed of a plurality of sub-LEDs. In this case, each lens can include a plurality of sub-lenses that are the same as each other, and each sub-lens is located on a corresponding sub-LED of the plurality of sub-LEDs. Therefore, it is possible to arbitrarily expand the number of LEDs and lenses included in the light source according to actual demands, so as to provide desired lighting brightness and/or a desired lighting range.

In the embodiment of the present application, provided are a lighting control method and a lighting control device, which are applied to a light source having a plurality of LEDs, and a lighting device. The method includes: acquiring the number N of LEDs and a control curve for controlling changes in brightness and color of the light emitted from each LED with a time t, wherein the control curve defines the same brightness cycle and color cycle for each LED, the brightness cycle indicates a brightness change period T of the LED and a brightness change curve of the change in brightness with the time t within each brightness change period, and the color cycle indicates a color change period, the number M of color intervals and a color change curve of the change in color with the time t within each color change period; determining a time offset on the control curve according to the number N and the brightness change period T; determining the starting timings to of the remaining LEDs on the control curve according to the starting timing t1 of the first LED and the time offset, so as to determine the starting timing of each LED on the control curve, wherein the starting timings of the N LEDs are different from each other; determining, from the control curve, starting brightness and a starting color corresponding to the starting timing of each LED, based on the starting timing of each LED; and controlling each LED of the plurality of LEDs, beginning from the corresponding starting brightness and starting color, to emit light according to the brightness and color determined by the control curve, wherein within a brightness change period, the brightness first decreases linearly from the highest brightness to the lowest brightness, and then increases linearly from the lowest brightness until returning to the highest brightness, within a color change period, the color gradually changes in the M color intervals, and the color that corresponds to the timing corresponding to the highest brightness on the control curve is a preset specific color; in this way, the problem of being difficult to realize a desired gradually changing lighting effect for a plurality of colors on a single transmitting housing in the prior art is at least solved, and thus realizing the effects of providing desired gradually changing light with a plurality of colors and creating a good entertainment atmosphere.

BRIEF DESCRIPTION OF THE DRAWINGS

The drawings constituting a part of the present application are used for providing a further understanding of the present application, and the exemplary embodiments of the present application and descriptions thereof are used for explaining the present application, but do not constitute improper limitations of the present application. In the drawings.

Figure 1:
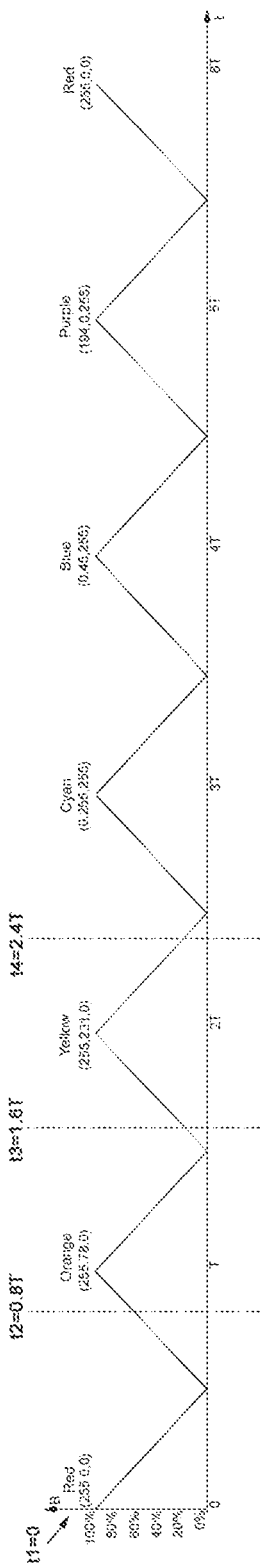
FIG. 1 is a schematic diagram of realizing multi-color gradually changing light by a lighting control method according to an exemplary embodiment of the present application.

The above drawings include the following reference signs:

100: Lighting control device
110: Acquisition module
120: Determination module
130: Control module
200: Light source
210: Light source assembly 220: Lens assembly
300, 400: Lighting device
500: Another lighting device
410, 510: Base
420, 520: Heat sink
430, 530: Driving board
440, 540: Lighting control module
450, 550: Sound guide column
460, 560: Light source portion
461, 561: Light source assembly
462, 562: Lens assembly
470, 570: Bulb shell
t1: The starting timing of LED1 on a control curve
t2: The starting timing of LED2 on the control curve
t3: The starting timing of LED3 on the control curve
t4: The starting timing of LED4 on the control curve

DETAILED DESCRIPTION

To make it necessary to explain, if there is no conflict, embodiments in the present application and features in the embodiments can be combined with each other. Hereinafter, the present application will be described in detail with reference to the drawings and in conjunction with the embodiments.

It should be pointed out that, unless otherwise specified, all technical and scientific terms used in the present application have the same meanings as commonly understood by those of ordinary skill in the technical field to which present application belongs.

In present application, unless otherwise stated, orientation words used such as "up, down, top and bottom" are usually directed to the directions shown in the drawings, or are directed to the vertical, perpendicular or gravitational direction of components themselves; and similarly, for the convenience of understanding and description, "inside and outside" refer to inside and outside relative to the contours of the components themselves, but the above-mentioned orientation words are not used for limiting the present application.

According to an embodiment of the present application, provided is a lighting control method for a light source having a plurality of LEDs, and the method including: acquiring the number N of LEDs and a control curve for controlling changes in brightness and color of the light emitted from each LED with a time t, the control curve defining the same brightness cycle and color cycle for each LED, wherein the brightness cycle indicates a brightness change period T of the LED and a brightness change curve of the change in brightness with the time t within each brightness change period, and the color cycle indicates a color change period T, the number M of color intervals and a color change curve of the change in color with the time t within each color change period, $M \geq 2$, and T'=MT;

determining a time offset on the control curve according to the number N and the brightness change period T;

acquiring a starting timing t1 of the first LED on the control curve, $0 \leq t1 < MT$;

determining a starting timing tn of the nth LED on the control curve according to the starting timing t1 of the first LED and the time offset: $tn = t1 + \text{offset} \times (n-1)$, $n = 2, 3, \ldots, N$, so as to determine the starting timing of each LED on the control curve, wherein $0 \leq tn < MT$, and the starting timings of the N LEDs are different from each other;

determining, from the control curve, starting brightness and a starting color corresponding to the starting timing of each LED, based on the starting timing of each LED; and controlling each LED of the plurality of LEDs, beginning from the corresponding starting brightness and starting color, to emit light according to the brightness and color determined by the control curve;

wherein, within a brightness change period, the brightness first decreases linearly from the highest brightness to the lowest brightness, and then increases linearly from the lowest brightness until returning to the highest brightness; and within a color change period, the color gradually changes in the M color intervals, and the color that corresponds to the timing corresponding to the highest brightness on the control curve is a preset specific color.

In this way, it is possible to emit multi-color gradually changing light with both gradually changing color and brightness from the light source, and thus a comfortable entertainment atmosphere can be created.

In the present embodiment, by acquiring the control curve that defines the appropriate brightness cycle and color cycle, each LED can be controlled to follow the specified brightness cycle and color cycle to simultaneously execute a gradual intensity change in the brightness of light and a gradual color phase change in the color of the light, thereby realizing a double gradual change in the color and brightness of a single LED.

In the present embodiment, the starting timing t1 of the first LED on the control curve can be set arbitrarily, as long as $0 \leq t1 < MT$. By means of determining the time offset on the control curve according to the number N of LEDs and the brightness change period T, the starting timings of all the remaining LEDs, which are determined according to the starting timing t1 and the time offset, can be different from each other, and different from the starting timing t1.

That is to say, in the present application, by means of setting the same control curve for each LED, and setting a different starting timing on the control curve for each LED, at a certain timing, the colors of the light emitted from the first LED to the last LED also gradually change according to a direction indicated by the color cycle, and the brightness of the light emitted from all the LEDs also gradually change according to a direction indicated by the brightness cycle.

That is, the present application not only enables the light emitted from a single LED to realize a double gradual change in color and brightness over time, but also enables the light emitted from all the LEDs to realize the double gradual change in color and brightness in the order of the LEDs at a certain timing, therefore, it is possible to control to emit gradually changing light, which contains a plurality of colors and has both gradually changing color and brightness, from the light source, such that a desired lighting atmosphere can be realized, and a user can experience pleasant lighting changes.

In the present embodiment, the determining the time offset on the control curve includes: calculating an initial value of the offset according to $\text{offset} = (\min(N, M) - 0.4) \times T/(N-1)$; and adjusting the initial value of the offset according to the relationship between the calculated initial value of the offset and the brightness change period T, so as to derive a final value of the offset, such that the value of the offset is prevented from approaching to 0, 0.5T or 1T.

The reason to present the value of the offset from approaching to 0, 0.5T or 1T is that: when the value of the offset approaches to 0 or 1T, all the LEDs follow the same brightness cycle (close to brightness synchronization), makes it impossible to form a gradually changing light effect with gradually changing brightness. When the value of the offset approaches to 0.5T, all the LEDs follow a nearly opposite brightness cycle, which will lead to excessive brightness differences between adjacent LEDs (for example, once after T/2, all the LEDs will present a brightness form with the brightest, the darkest, the brightest and the darkest . . . at the same time), makes it impossible to form the gradually changing light effect with gradually changing brightness.

In an exemplary embodiment of the present application, the value of the offset being prevented from approaching to 0, 0.5T or 1T means that the value of the offset deviates from 0, 0.5T or 1T by more than 0.1T. Further, the value of the offset can deviate from 0.5T by more than 0.1T, and/or deviate from 0 and 1T by more than 0.2T.

In an exemplary embodiment of the present application, the initial value of the offset can be adjusted according to the relationship between the calculated initial value of the offset and the brightness change period T in the following manner, so as to derive the final value of the offset:

determining whether the initial value of the offset is in an interval [0T, 0.2T], [0.4T, 0.5T], [0.5T, 0.6T], or [0.8T, 1.2T], and when it is determined that the initial value of the offset is in the interval [0T, 0.2T], deriving the final value of the offset as 0.2T;

when it is determined that the initial value of the offset is in the interval [0.4T, 0.5T], deriving the final value of the offset as 0.4T;

when it is determined that the initial value of the offset is in the interval [0.5T, 0.6T], deriving the final value of the offset as 0.6T;

when it is determined that the initial value of the offset is in the interval [0.8T, 1.2T], deriving the final value of the offset as 0.8T; and when it is determined that the initial value of the offset is not in the interval [0T, 0.2T], [0.4T, 0.5T], [0.5T, 0.6T] and [0.8T, 1.2T], deriving the final value of the offset as the calculated initial value of the offset.

In the present embodiment, within a color change period, the color of the light emitted from each LED gradually changes in the M color intervals in the order of spectral wavelengths corresponding to the M color intervals from large to small or from small to large. In this way, it is possible to realize a desired and natural gradual change in color in the M color intervals in the order of the spectral wavelengths from large to small or from small to large.

In the embodiment of the present application, the spectral wavelengths corresponding to the M color intervals are continuous. In this way, for example, when the color of the light gradually changes in the M color intervals in the order of the spectral wavelengths corresponding to the M color intervals from large to small, the color of the light gradually changes in each color interval, and also gradually changes between adjacent color intervals, thereby ensuring an excellent gradually changing light effect.

In the present embodiment, the preset specific color includes M specific colors belonging to different color intervals from each other, and each of the M specific colors is defined as a color with a purity of 100% in the color interval to which it belongs.

Since the color change period T'=MT, a total of M pieces of highest brightness can appear within a color change period. In this way, within a color change period, each of the M pieces of highest brightness can correspond to the color with the purity of 100% in the corresponding color interval of the M color intervals. At this time, a color interval can correspond to exactly a brightness change period in time.

It should be noted that, in the present application, the color with the purity of 100% in each color interval can be specified by a specific RGB value in the RGB color space. Further, the change in purity can be represented by the change in the RGB value.

When M=6, for example, the M color intervals are respectively: a red interval, an orange interval, a yellow interval, a cyan interval, a blue interval and a purple interval. Therefore, when going from one color change period to the next color change period (that is, when the color changes from the purple interval to the red interval), the change in color is also gradual. Therefore, gradually changing color cycles are realized.

It should be noted that, in the present application, the number N of LEDs and the number M of color intervals can be any integer greater than two. For example, when M=2, the two color intervals can be: a red interval and an orange interval; when M=3, the three color intervals can be: a red interval, an orange interval and a yellow interval; and so on.

Next, the lighting control method according to the embodiment of the present application will be described in detail with reference to FIG. 1. FIG. 1 is a schematic diagram of realizing multi-color gradually changing light in the lighting control method according to an exemplary embodiment of the present application. It is considered in an example of the control curve shown in FIG. 1 that the number of LEDs N=4, the number of color intervals M=6, and the 6 color intervals are sequentially: a red interval, an orange interval, a yellow interval, a cyan interval, a blue interval and a purple interval.

As shown in FIG. 1, the brightness cycle indicates a brightness change period T of the light emitted from a single LED and a brightness change curve of the change in brightness with the time t within each brightness change period. FIG. 1 shows 6 brightness change periods in the brightness cycle to correspond to a color change period r.

Within the first brightness change period, when t=0m, the brightness is preset 100% brightness, then the brightness decreases linearly with the time t until the brightness is 0 when t=T/2, and then the brightness increases linearly with the time t until it returns to the preset 100% brightness when t=T. Then, it proceeds to the next brightness change period.

Within the color change period, when t=0m, the color is red with the purity of 100%, then the red with the purity of 100% gradually changes to orange until the color is orange with the purity of 100% when t=T, then the orange with the purity of 100% gradually changes to yellow until the color is yellow with the purity of 100% when t=2T, then the yellow with the purity of 100% gradually changes to cyan until the color is cyan with the purity of 100% when t=3T, then the cyan with the purity of 100% gradually changes to blue until the color is blue with the purity of 100% when t=4T, then the blue with the purity of 100% gradually changes to purple until the color is purple with the purity of 100% when t=5T, then the purple with the purity of 100% gradually changes to red until the color returns to red with the purity of 100% when t=6T. Then, it proceeds the next color change period.

The gradual change in the color means: when the color gradually changes from the interval of the current color to the interval of the next color, the purity of the current color decreases linearly, and at the same time, the purity of the next color increases linearly.

That is to say, on the control curve, the 100% brightness can correspond to a certain color with the purity of 100%, and the brightness 0 can correspond to a combination of two adjacent colors with the purity of 50%. In this way, the light emitted from each LED will have the preset 100% brightness and the purity of 100% at the same time, such that during a gradual change process of light, an excellent lighting effect of bright-colored light with high saturability can be presented after every period of time.

In the present application, the preset 100% brightness is a preset highest brightness value, for example, it can correspond to a luminous flux of 30 lumens. The lowest brightness is 0, which means that the LED does not emit light at the timing of the lowest brightness.

By means of the preset highest brightness and lowest brightness, it is possible to make each LED present a significant intensity change in brightness when emitting light, thereby presenting a desired lighting effect with gradually changing brightness.

In the embodiment of the present application, the red interval can be defined as an interval from a combination of purple with the purity of 50% and red with the purity of 50% to a combination of red with the purity of 50% and orange with the purity of 50%. The orange interval can be defined as an interval from the combination of red with the purity of 50% and orange with the purity of 50% to a combination of orange with the purity of 50% and yellow with the purity of 50%. The yellow interval can be defined as an interval from the combination of orange with the purity of 50% and yellow with the purity of 50% to a combination of yellow with the purity of 50% and cyan with the purity of 50%. The cyan interval can be defined as an interval from the combination of yellow with the purity of 50% and cyan with the purity of 50% to a combination of cyan with the purity of 50% and blue with the purity of 50%. The blue interval can be defined as an interval from the combination of cyan with the purity of 50% and blue with the purity of 50% to a combination of blue with the purity of 50% and purple with the purity of 50%. The purple interval can be defined as an interval from the combination of blue with the purity of 50% and purple with the purity of 50% to a combination of purple with the purity of 50% and red with the purity of 50%. Each color interval corresponds to a brightness change period T in time.

For example, when the brightness change period T=1000 ms, T can be divided into 100 equal parts, that is, 10 ms is used as a step length of color change. At this time, for the first color change period, when the color is red with the purity of 100%, but the red with the purity of 100% gradually changes linearly toward the orange direction, when t=10 ms, the color changes into a combination of red with the purity of 99% and orange with the purity of 1%, when t=20 ms, the color changes into a combination of red with the purity of 98% and orange with the purity of 2%, . . . , when t=500 ms, the color changes into a combination of red with the purity of 50% and orange with the purity of 50%, . . . , until the color changes into orange with the purity of 100% when t=1000 ms. The color change mode after t=1000 ms can be deduced by analogy.

In the present application, the change in color purity can be represented by the change in the RGB value that represents the color. For example, within the first brightness change period, when red with the purity of 100% (i.e., (255, 0, 0)) gradually changes to orange with the purity of 100% (i.e., (255, 78, 0)), it can be considered that a red component represented by R in the RGB value gradually decreases, and meanwhile, an orange component represented by R and G in the RGB value gradually increases. Similarly, when purple with the purity of 100% (i.e., (194, 0, 255)) gradually changes to red with the purity of 100% (i.e., (255, 0, 0)), it can be considered that a purple component represented by R and B in the RGB value gradually decreases, and meanwhile, the red component represented by R in the RGB value gradually increases.

FIG. 1 further shows the RGB value corresponding to each color with the purity of 100%. It should be noted that, the RGB values shown in FIG. 1 are only examples. Those skilled in the art can set, according to demands, the RGB value corresponding to each color with the purity of 100% and a change value of the corresponding color component during once change of each color.

In fact, as the color of light gradually changes in the order of the red interval, the orange interval, the yellow interval, the cyan interval, the blue interval and the purple interval, when viewed at every timing or after a certain period of time, the multi-color light emitted from the light source presents a rainbow-like pattern, thus presenting a more comfortable and more pleasant lighting atmosphere than traditional lamps.

Alternatively, within a time period from t=5T to 6T on the control curve (that is, the time period when the purity of purple decreases progressively and the purity of red increases progressively), it is possible to make the purity of red increase progressively faster, so as to avoid unapparent red growth in the gradual change process. For example, when the purity of purple decreases progressively by 1% every 10 ms, the purity of red can increase slightly faster, in order to reach 100% pure red earlier. Furthermore, after reaching the 100% pure red, the color is kept at 100% pure red for a period of time, until the purity begins to decrease progressively at t=6T. The progressive decrease speed can be the same as the change speed of other colors.

FIG. 1 further shows, when the starting timing t1 of the first LED (i.e., LED1) on the control curve is set to 0, the positions of the starting timings t2-t4 of the second LED (i.e., LED2) to the fourth LED (i.e., LED4) on the control curve.

Figure 2:
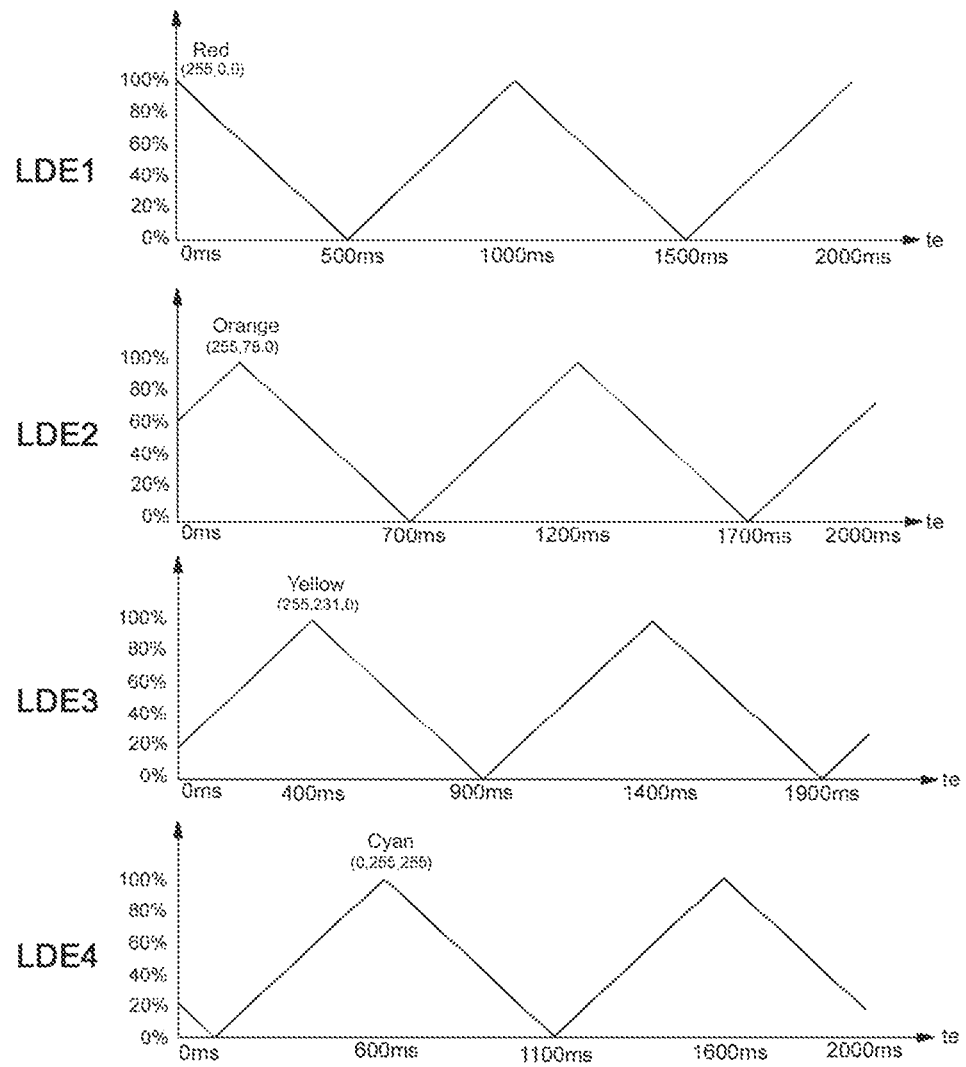
FIG. 2 is a diagram showing an example of LED lighting control implemented by the lighting control method according to the embodiment of the present application.

FIG. 2 is a diagram showing an example of LED lighting control implemented by the lighting control method according to the embodiment of the present application. FIG. 2 shows an example of changes in the lighting of the 4 LEDs (LED1 to LED4) determined according to FIG. 1 with the lighting time.

An abscissa in FIG. 2 represents the lighting time te of each LED, a vertical coordinate represents percentage brightness B, and the brightness change period T is shown as 1000 ms. It should be noted that, since all the LEDs emit light at the same time, all the LEDs emit light at the same time beginning from the lighting time te. It should be noted that, 1000 ms is only an example in the present application, and the brightness change period T can be set to any appropriate value in the present application, such as 100 ms, 200 ms, 400 ms, . . . , 1500 ms, 3000 ms, etc.

In FIG. 2, since the starting timing t1 of the LED1 on the control curve is 0, the corresponding starting brightness and starting color are 100% brightness and red with the purity of 100%. The red is expressed as (255, 0, 0) in an RGB gray value. Therefore, the LED1, beginning from the 100% brightness and the red with the purity of 100%, that is, beginning from the position at the timing t:$ on the control curve, emits light according to the brightness and color determined by the control curve.

In FIG. 2, since the number N of the LEDs is 4, the time offset of adjacent LEDs on the control curve is determined as 0.8T.

Therefore, the starting timing t2 of the LED2 on the control curve is 0.8T, the corresponding starting brightness is 60% brightness, and the starting color is a combination of red with the purity of 20% and orange with the purity of 80%. Then, the LED2, beginning from the starting brightness and the starting color, that is, beginning from the position at the timing t=0.8T on the control curve, emits light according to the brightness and color determined by the control curve.

Similarly, the starting timing t3 of the LED3 on the control curve is 1.6T, the corresponding starting brightness is 20% brightness, and the starting color is a combination of orange with the purity of 40% and yellow with the purity of 60%. Then, the LED3, beginning from the starting brightness and the starting color, that is, beginning from the position at the timing t=1.6T on the control curve, emits light according to the brightness and color determined by the control curve.

Similarly, the starting timing t4 of the LED4 on the control curve is 2.4T, the corresponding starting brightness is 20% brightness, and the starting color is a combination of yellow with the purity of 60% and cyan with the purity of 40%. Then, the LED4, beginning from the starting brightness and the starting color, that is, beginning from the position at the timing t=2.4T on the control curve, emits light according to the brightness and color determined by the control curve.

Figure 3:
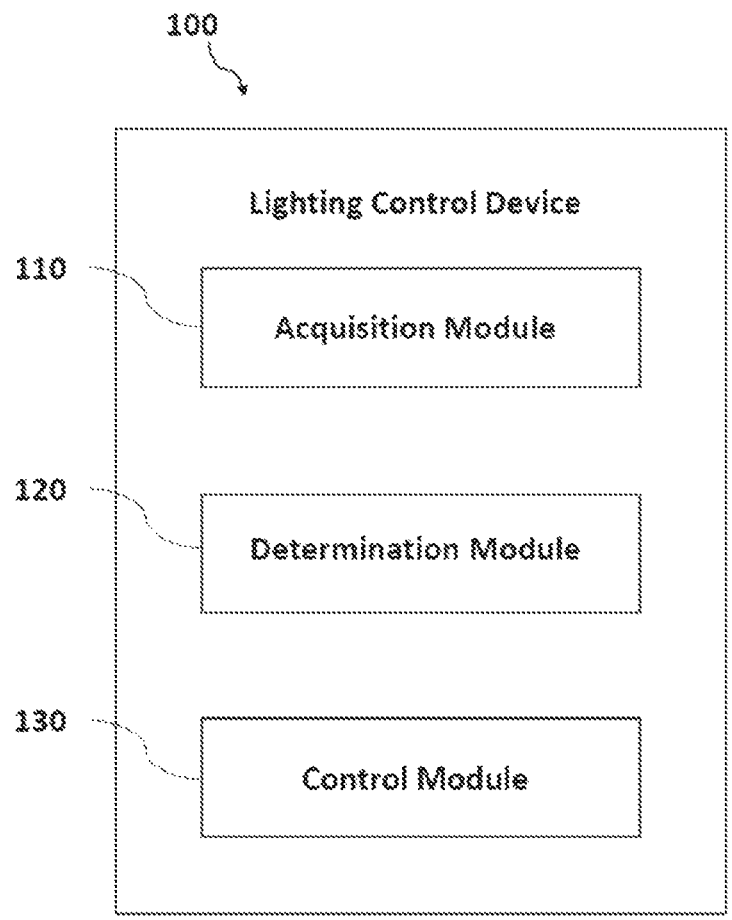
FIG. 3 is a schematic block diagram of a lighting control device according to an embodiment of the present application.

FIG. 3 is a schematic block diagram of a lighting control device according to an embodiment of the present application. The lighting control device shown in FIG. 3 corresponds to the lighting control method according to the embodiment of the present application.

As shown in FIG. 3, the lighting control device 100 for a light source having a plurality of LEDs includes:

an acquisition module 110, configured to:

acquire the number N of LEDs and a control curve for controlling changes in brightness and color of the light emitted from each LED with a time t, the control curve defining the same brightness cycle and color cycle for each LED, wherein the brightness cycle indicates a brightness change period T of the LED and a brightness change curve of the change in brightness with the time t within each brightness change period, and the color cycle indicates a color change period T', the number M of color intervals and a color change curve of the change in color with the time t within each color change period, M≥2, and T'=MT, and acquire a starting timing t1 of the first LED on the control curve, 0≤t1<MT;

a determination module 120, configured to:

determine a time offset on the control curve according to the number N and the brightness change period T from the acquisition module, determine the starting timing tn of the nth LED on the control curve according to the time offset and the starting timing t1 of the first LED from the acquisition module: tn=t1+offset×(n−1), n=2, 3, . . . , N, so as to determine the starting timing of each LED on the control curve, wherein 0≤tn<MT, and the starting timings of the N LEDs are different from each other, and determine, from the control curve, starting brightness and a starting color corresponding to the starting timing of each LED, based on the starting timing of each LED; and a control module 130, configured to: control each LED of the plurality of LEDs, beginning from the corresponding starting brightness and starting color, to emit light according to the brightness and color determined by the control curve, wherein within a brightness change period, the brightness first decreases linearly from the highest brightness to the lowest brightness, and then increases linearly from the lowest brightness until returning to the highest brightness; and within a color change period, the color gradually changes in the M color intervals, and the color that corresponds to the timing corresponding to the highest brightness on the control curve is a preset specific color.

The functions of the modules of the lighting control device 100 shown in FIG. 3 respectively correspond to the steps of the lighting control method according to the present application, and thus will not be repeated herein.

The lighting control device 100 shown in FIG. 3 can further include a storage module (not shown), in which the number N of LEDs of the light source, the control curve for controlling the changes in brightness and color of the light emitted from each LED with the time t, and the starting timing t1 of the LED1 on the control curve can be stored. The acquisition module 110 can acquire the above-mentioned data from the storage module inside the lighting control device 100, so as to determine the changes in brightness and color of the light emitted from each LED with the time t.

Alternatively, the above-mentioned data can also be stored outside the lighting control device 100, for example, stored in a cloud server or the like that is capable of performing wireless communication with the lighting control device 100. The acquisition module 110 of the lighting control device 100 can also acquire the above-mentioned data from the outside of the lighting control device 100.

In addition, the lighting control device 100 can further include an input module (not shown). The acquisition module 110 can also receive the input of a user on the starting timing t1 of the LED1 on the control curve through the input module.

Figure 4:
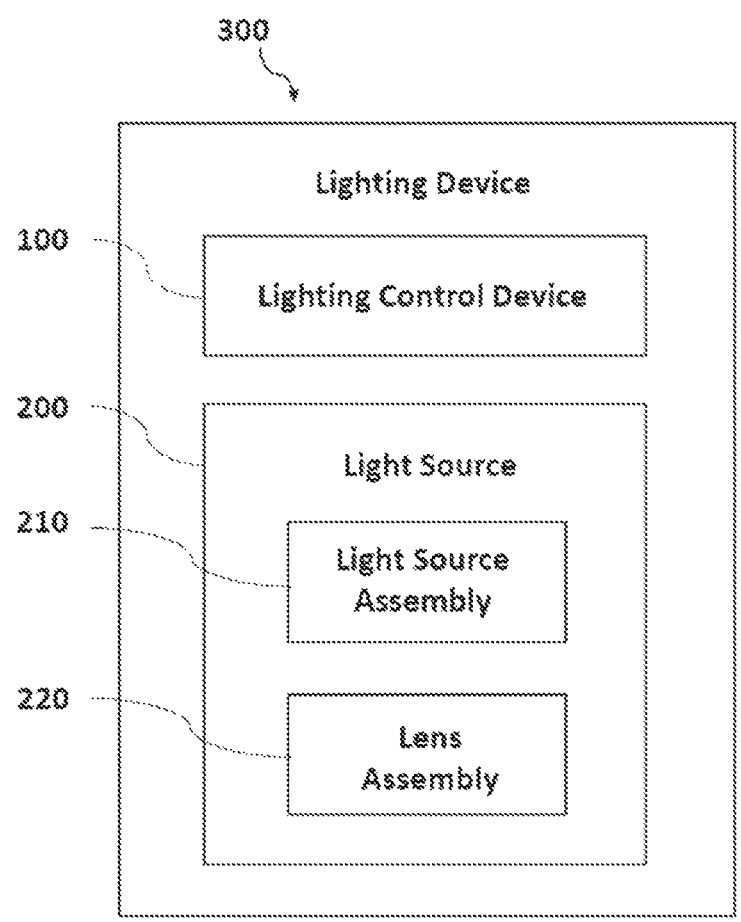
FIG. 4 is a schematic block diagram of a lighting device according to an exemplary embodiment of the present application.

FIG. 4 is a schematic block diagram of a lighting device according to an exemplary embodiment of the present application. As shown in FIG. 4, the lighting device 300 includes the lighting control device 100 shown in FIG. 3, and a light source 200 having a plurality of LEDs.

In the present application, the light source 200 includes: a light source assembly 210, including a plurality of LEDs; and a lens assembly 220, including a plurality of lenses, wherein each of the plurality of lenses is located on a corresponding one of the plurality of LEDs.

In this way, it is possible to diffuse the light emitted from the corresponding LED to a certain angle by using the lens.

The lighting device 300 can further includes a bulb shell, and the bulb shell surrounds the light source and transmits the light emitted from the light source to the outside after diffuse reflection, wherein each lens transmits the light emitted from a corresponding LED to the outside through a corresponding lighting area on the bulb shell, and on the bulb shell, two adjacent lighting areas corresponding to two adjacent LEDs are separated from each other, or are partially overlapped with each other.

In this way, each lens can transmit the light emitted from the corresponding LED to the outside through the corresponding lighting area on the bulb shell, the lens diffuses light beams emitted from the LED, and meanwhile can avoid color confusion caused by the overlapping of the light emitted from the LEDs. Specifically, by setting the diffusion angle and the inclination angle of the lens, on the bulb shell, the two adjacent lighting areas corresponding to the two adjacent LEDs are separated from each other while being contiguous, or are partially overlapped with each other (for example, the overlapping area does not exceed 20%, 10% or 5% of the area of the lighting area). In this way, the edge transition of the light transmitted from the adjacent lighting areas on the bulb shell is smooth, while the confusion of the light of the adjacent lighting areas is avoid, thereby facilitates realizing an excellent gradually changing light effect.

In the embodiment of the present application, the LED used is an RGB LED, that is, a three-in-one LED. An RLED emitting red light, a GLED emitting green light and a BLED emitting blue light are integrated in one LED. By individually controlling the RLED, the GLED and the BLED in one LED to respectively emit red light, green light and blue light with appropriate brightness, it is possible to make the RGB LED emit any color in an RGB color space.

In the embodiment of the present application, each LED can include a plurality of sub-LEDs that are the same as each other, and at any timing, the lighting color and lighting brightness of the plurality of sub-LEDs in one LED are the same. At this time, each LED in the light source 200 can be a group of sub-LEDs composed of a plurality of sub-LEDs. In this case, each lens can include a plurality of sub-lenses that are the same as each other, and each sub-lens is located on a corresponding sub-LED of the plurality of sub-LEDs. Therefore, it is possible to arbitrarily expand the number of LEDs and lenses included in the light source according to actual demands, so as to provide desired lighting brightness and/or a desired lighting range.

It should be noted that, the lighting control device 100 and the light source 200 of the lighting device 300 need not be integrated in a housing, but they can also be arranged separately from each other. For example, they are arranged in different housings or are separated from each other, as long as they can communicate in a wired or wireless mode.

When the lighting control device 100 and the light source 200 are integrated in a housing, the lighting device 300 can be formed as a single device, such as a bulb.

The present application further provides a lighting device, including: the light source 200 shown in FIG. 4, wherein the light source 200 includes a light source assembly 210 having plurality of LEDs, and a lens assembly 220 having a plurality of lens, and each of the plurality of lenses is located on a corresponding one of the plurality of LEDs; and a bulb shell, which surrounds the light source and transmits the light emitted from the light source to the outside after diffuse reflection, wherein the brightness of the light emitted from each LED changes cyclically according to the same brightness change period, the color of the light emitted from each LED changes cyclically according to the same color change period, and the brightness and/or color of the plurality of LEDs are different from each other at any timing.

In this way, it is possible to emit multi-color gradually changing light with both gradually changing color and brightness from the light source of the lighting device, and multi-color gradually changing light with both gradually changing color and brightness can be formed on the bulb shell of the lighting device, thereby providing a desired lighting atmosphere to create a comfortable entertainment atmosphere.

In the present embodiment, for each LED, the color change period is several times the brightness change period; within a brightness change period, the brightness first decreases linearly from the highest brightness to the lowest brightness, and then increases linearly from the lowest brightness until returning to the highest brightness; and within a color change period, the color gradually changes in a plurality of color intervals, and the color corresponding to the highest brightness is a preset specific color.

In this way, each LED can realize a periodic gradual change in the intensity of the lighting brightness, and can also realize a periodic gradual change in the lighting color in the plurality of color intervals, so as to realize a double periodic gradual change in the color and brightness of a single LED, and then desired multi-color gradually changing light with both gradually changing color and brightness is formed on the bulb shell of the lighting device.

In the present embodiment, each lens transmits the light emitted from a corresponding LED to the outside through a corresponding lighting area on the bulb shell, and on the bulb shell, two adjacent lighting areas corresponding to two adjacent LEDs are separated from each other or are partially overlapped with each other. In this way, the lens can limit the light emitted from the corresponding LED to a specific lighting area on the bulb shell, so as to avoid the confusion of the light emitted from different LEDs, which is conducive to realizing an excellent gradually changing light effect.

In an exemplary embodiment, each LED can include a plurality of sub-LEDs that are the same as each other, and at any timing, the lighting color and lighting brightness of the plurality of sub-LEDs in one LED are the same. In this way, each LED can be a group of sub-LEDs composed of a plurality of sub-LEDs. At this time, each lens can also include a plurality of sub-lenses that are the same as each other, and each sub-lens is located on a corresponding sub-LED of the plurality of sub-LEDs.

In the present embodiment, the multi-color gradually changing light with both gradually changing color and brightness emitted from the lighting device can be implemented by the lighting control device 100 shown in FIG. 3.

Hereinafter, two embodiments of the lighting device 300 in which the lighting control device 100 and the light source 200 are integrated in a housing will be described with reference to FIGS. 5 to 10. The two embodiments correspond to bulbs of two structures. The maximum difference between the two bulbs is that the former emits multi-color gradually changing light from the bulb shell in the range of 220-240 degrees, and the latter emits the multi-color gradually changing light from the bulb shell in the range of 160-180 degree.

Figure 5:
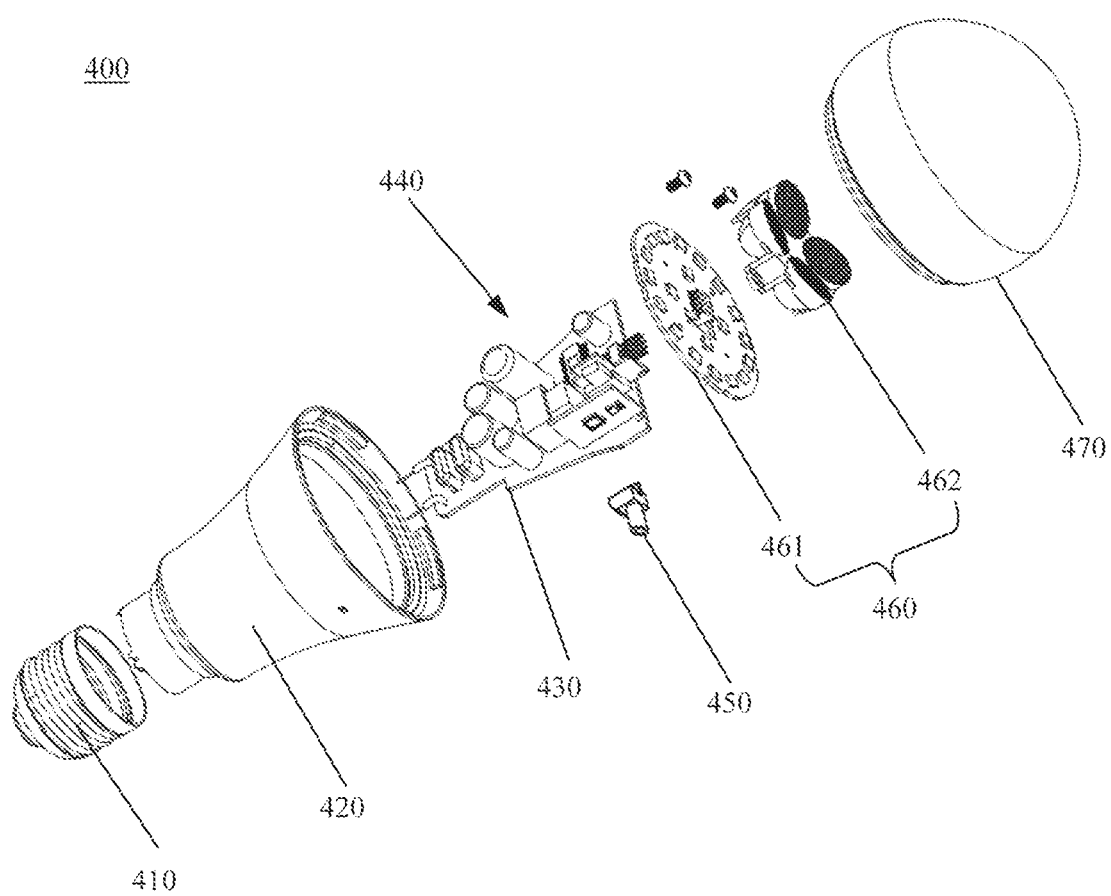
FIG. 5 is a schematic structural diagram of a lighting device according to an exemplary embodiment of the present application.
Figure 6:
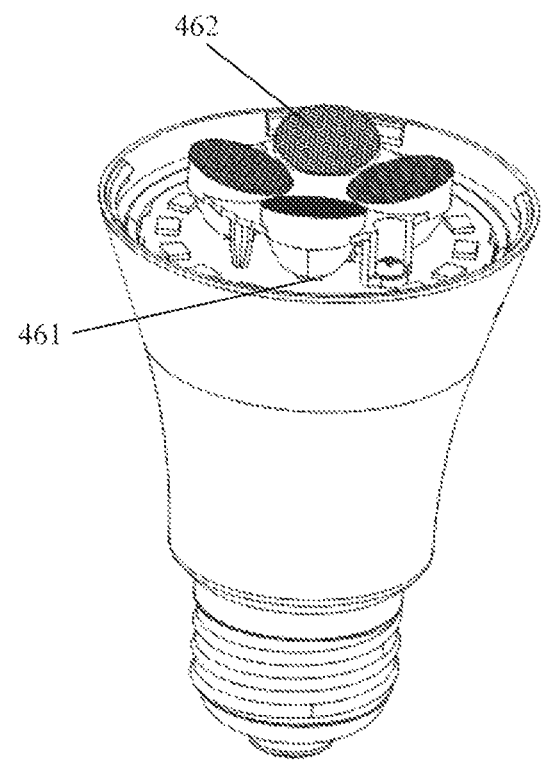
FIG. 6 is a diagram showing details of a light source portion of the lighting device shown in FIG. 5.
Figure 6:
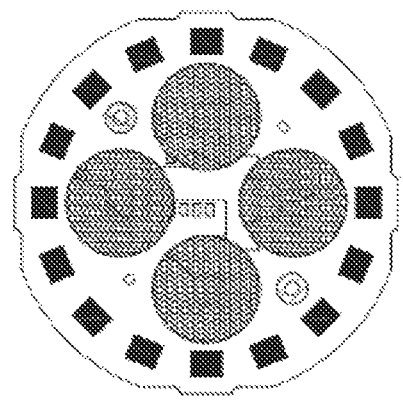
Figure 6:
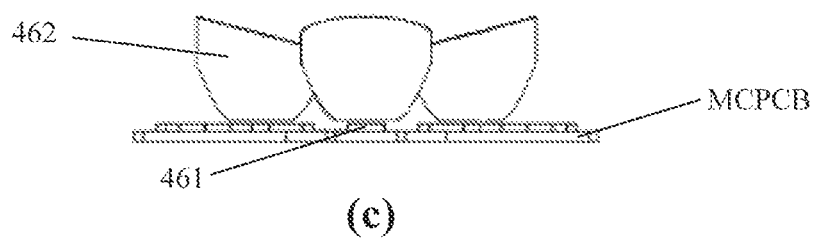
Figure 7:
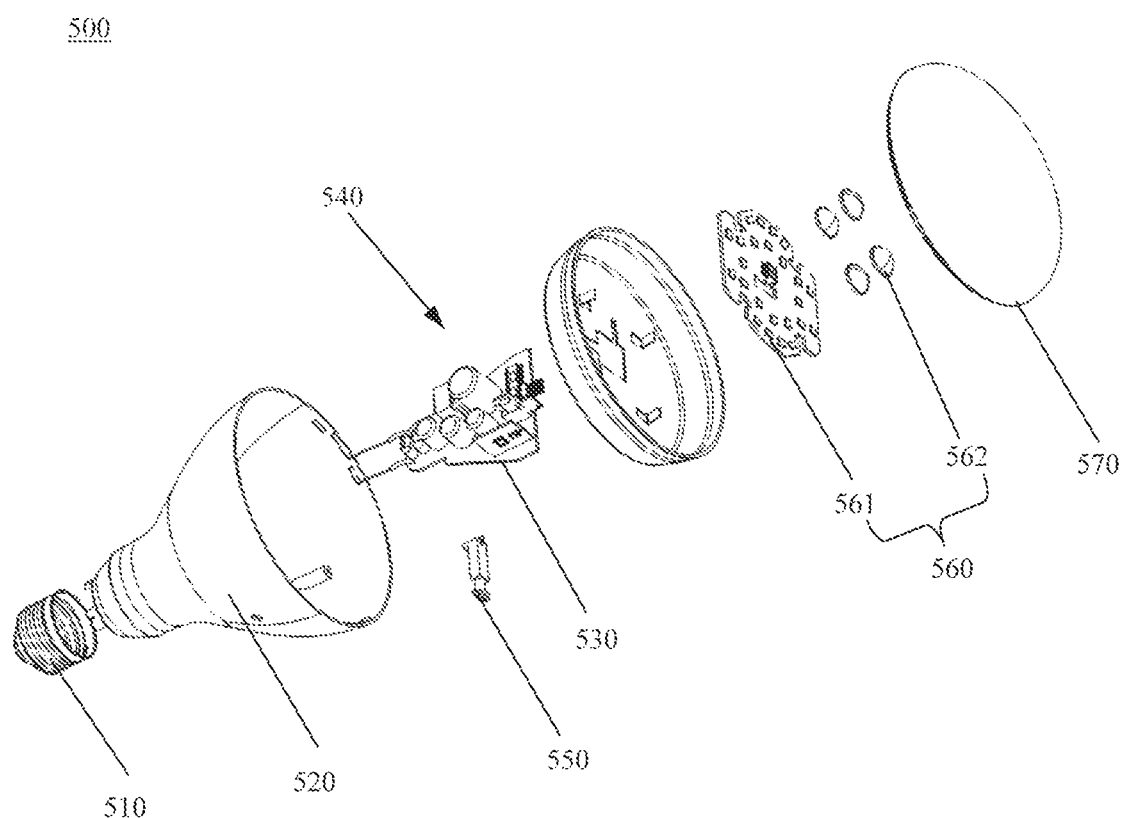
FIG. 7 is a schematic structural diagram of another lighting device according to another exemplary embodiment of the present application.
Figure 8:
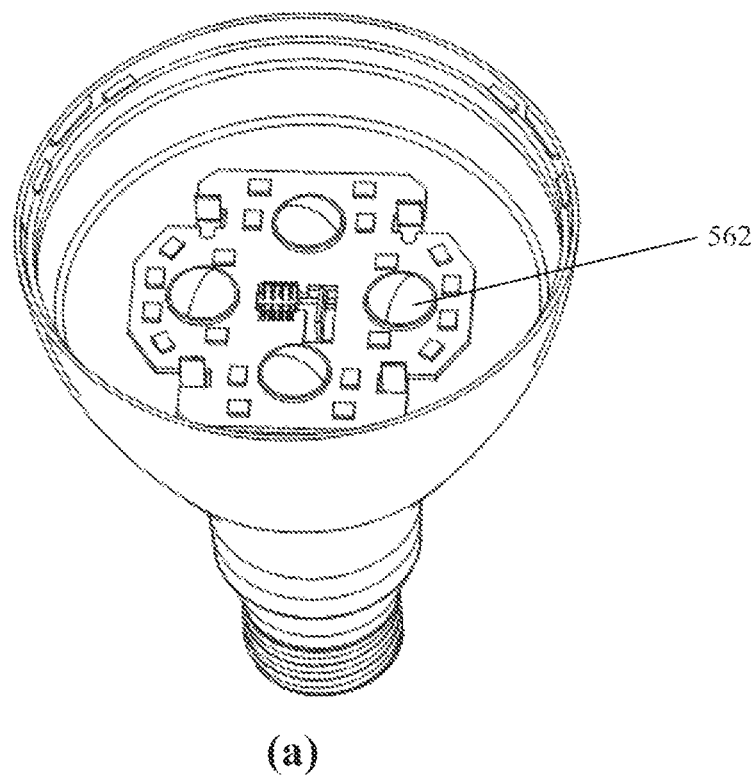
FIG. 8 is a diagram showing details of the light source portion of the lighting device shown in FIG. 7.
Figure 8:
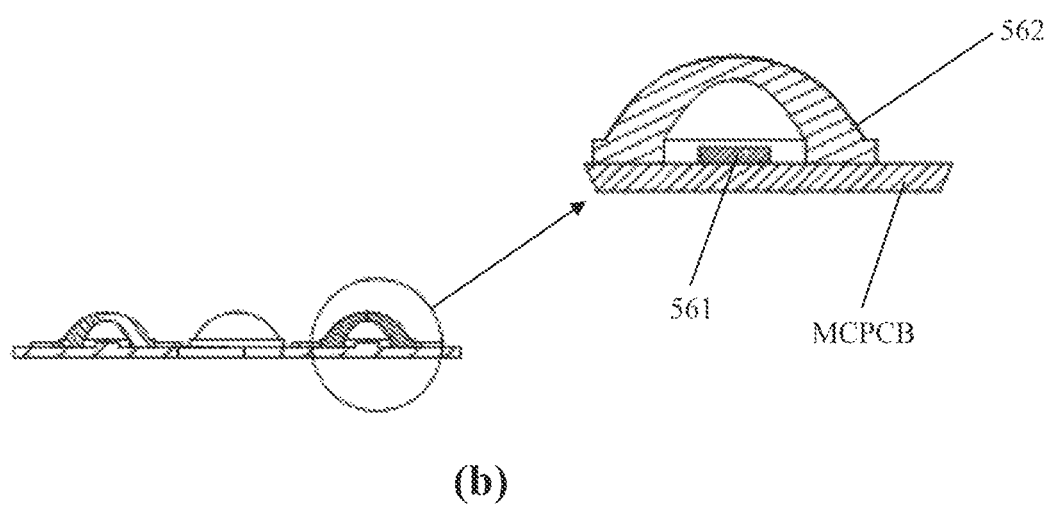
Figure 9:
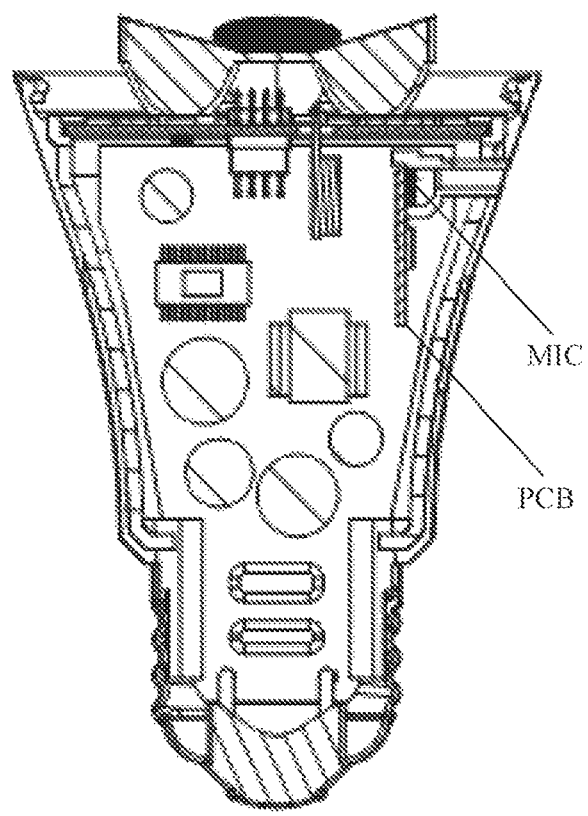
FIG. 9 is a schematic cross-sectional view showing the lighting device shown in FIG. 5.
Figure 10:
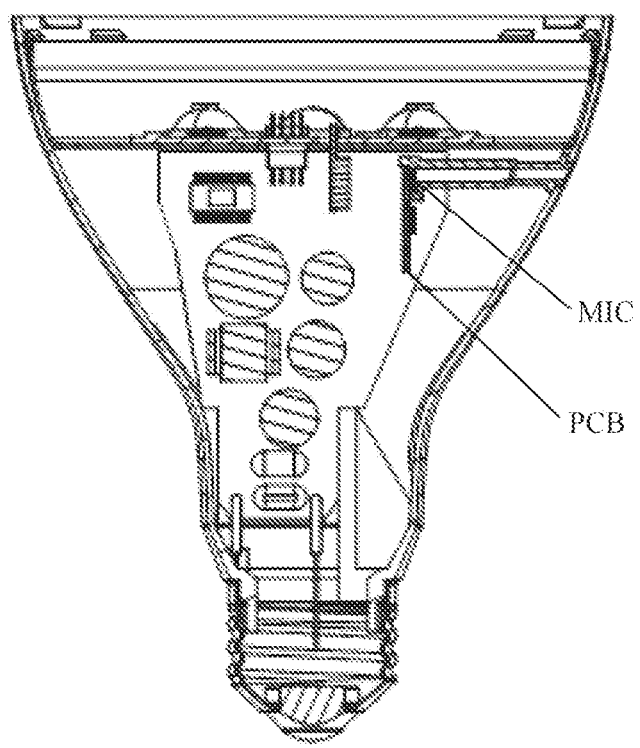
FIG. 10 is a schematic cross-sectional view showing the lighting device shown in FIG. 7.

FIG. 5, FIG. 6 and FIG. 9 show a schematic structure of a lighting device 400 according to an exemplary embodiment of the present application. The lighting device 400 is an exemplary embodiment of the lighting device 300, and the lighting device 400 is a single LED bulb. FIG. 7, FIG. 8 and FIG. 10 show a schematic structure of another lighting device 500 according to an exemplary embodiment of the present application. The lighting device 500 is another exemplary embodiment of the lighting device 300, and the lighting device 500 is a single LED bulb.

Hereinafter, the lighting device 400 according to the exemplary embodiment of the present application will be described with reference to FIG. 5, FIG. 6 and FIG. 9.

FIG. 5 is a schematic structural diagram of a lighting device according to an exemplary embodiment of the present application. As shown in FIG. 5, the lighting device 400 sequentially includes from bottom to top: a base 410, a heat sink 420, a driving board 430 (including a driver and related electronic components), a lighting control module 440 arranged on the driving board 430, a sound guide column 450, a light source portion 460 (including a light source assembly 461 and a lens assembly 462), and a bulb shell 470. These components are mechanically connected to each other, and the driving board 430, the lighting control module 440 and the light source portion 460 are electrically connected to each other through a PCB. The lighting control module 440 corresponds to the lighting control device 100 shown in FIG. 3. The light source portion 460 corresponds to the light source 200 shown in FIG. 4, the light source assembly 461 corresponds to the light source assembly 210 shown in FIG. 4, and the lens assembly 462 corresponds to the lens assembly 220 shown in FIG. 4.

FIG. 5 shows an exemplary embodiment in which the light source assembly includes 4 RGB LEDs.

In FIG. 5, the lighting control module 440 can be arranged on the driving board 430 or connected to the driving board 430. The lighting control module 440 determines changes in color and brightness of the light emitted from each LED with the lighting time, and converts the changes in color and brightness with the lighting time into lighting control signals, so as to transmit the same to an LED tuning circuit (not shown) that is used for controlling the emission of the 4 RGB LEDs. The LED tuning circuit converts the lighting control signals into 12 current signals for individually controlling an RLED, a GLED and a BLED in each RGB LED, and transmits the current signals upward to each RGB LED in the light source assembly, so as to control each RGB LED to emit light according to the color and brightness determined by the lighting control module. The driver on the driving board 430 is used for supplying power to the LED tuning circuit and each RGB LED. Under the driving of the driver and the control of the current signals of the LED tuning circuit, the four RGB LEDs emit light according to the color and brightness controlled by the lighting control module 440. After passing through the corresponding lens, the emitted light is transmitted to the outside by the diffuse reflection of the bulb shell 470, thereby forming desired multi-color light with gradually changing brightness and color, or rainbow-like light on the bulb shell 470.

FIG. 6 is a diagram showing details of the light source portion 460 of the lighting device 400 shown in FIG. 5. The light source portion 460 includes the light source assembly 461 and the lens assembly 462. As shown in (a), (b) and (c) of FIG. 6, in the light source assembly 461, the four RGB LEDs are arranged at front, back, left and right positions (for example, central symmetry). The light source assembly 461 is arranged on an MCPCB to emit light by using the current and voltage transmitted by the MCPCB. In the lens assembly 462, 4 lenses are respectively arranged directly above the 4 RGB LEDs, such that the light emitted from the corresponding RGB LEDs directly enters the lenses. The convex surface of each lens faces downward and the plane surface of each lens faces upward, such that the light passing through the lens is incident on a specified lighting area of the bulb shell (for example, a lighting area in the range of 60 degrees). In addition, each lens is inclined at an inclination angle of 30 degrees, so as to prevent the light passing through each lens from being incident on the same area on the bulb shell, or to avoid excessive overlapping of the various lighting areas. In fact, in the case of the inclination angle of 30 degrees, the light emitted from each of the 4 RGB LEDs can be incident on the lighting area of nearly 60 degrees of the bulb shell, and meanwhile, the adjacent lighting areas are separated from each other or are partially overlapped with each other. For example, the overlapping area of the adjacent lighting areas does not exceed 20%, 10%, 5%, and so on. As a result, a total lighting area of 220 degrees to 240 degrees can be realized on the bulb shell, and the lighting area of each color transitions naturally, thereby realizing the desired multi-color light with gradually changing brightness and color.

More functions can also be integrated in the lighting device 400 shown in FIG. 5 and FIG. 6.

For example, the light source portion of the lighting device 400 can further include a plurality of white LEDs. The plurality of white LEDs are arranged in a ring shape around the 4 RGB LEDs. No lens is arranged on the white LED, and the white LED and the RGB LED do not emit light at the same time. In other words, by setting a circle of white LEDs, the lighting device 400 can also realize a function of white light illumination. It should be noted that, the illumination color is not limited to this, but can be arbitrarily set as needed. For example, the lighting device 400 can also implement a function of yellow light illumination by additionally providing a yellow LED.

For example, an audio chip MIC can also be connected to the driving board 430 of the lighting device 400. FIG. 9 is a schematic cross-sectional view showing the lighting device 400 shown in FIG. 5. As shown in FIG. 9, the audio chip MIC can be connected to the driving board 430 through a PCB, and the audio chip MIC is opened outward through the sound guide column to receive an external voice input, for example, a voice input of the user. The MIC can receive the external voice input through the sound guide column, and convert the received voice input into a voice control signal, and then convert the voice control signal into a lighting control signal through an appropriate control module, so as to control each RGB LED or white light LED to emit light.

In addition, the external voice input can also be music, or the lighting device 400 can directly receive an audio signal, and convert the audio signal into a lighting control signal through a corresponding conversion module and control module, so as to control the emission of the RGB LEDs.

In this way, synchronous changes in the color and brightness of the RGB LED with the music can also be realized, thereby presenting a richer lighting atmosphere.

Hereinafter, the lighting device 500 according to another exemplary embodiment of the present application will be described with reference to FIG. 7, FIG. 8 and FIG. 10. FIG. 7 is a schematic structural diagram of another lighting device according to another exemplary embodiment of the present application.

As shown in FIG. 7, similar to FIG. 5, the lighting device 500 sequentially includes from bottom to top: a base 510, a heat sink 520, a driving board 530 (including a driver and related electronic components), a lighting control module 540 arranged on the driving board 530, a sound guide column 550, a light source portion 560 (including a light source assembly 561 and a lens assembly 562), and a bulb shell 570. The lighting control module 540 corresponds to the lighting control device 100 shown in FIG. 3. The light source portion 560 corresponds to the light source 200 shown in FIG. 4, the light source assembly 561 corresponds to the light source assembly 210 shown in FIG. 4, and the lens assembly 562 corresponds to the lens assembly 220 shown in FIG. 4. FIG. 7 also shows an example in which the light source assembly includes 4 RGB LEDs.

The lighting control module 540 can be arranged on the driving board 430 or connected to the driving board 430. The lighting control module 540 determines changes in color and brightness of the light emitted from each LED with the lighting time, and converts the changes in color and brightness with the lighting time into lighting control signals, so as to transmit the same to an LED tuning circuit (it is not shown and can be arranged on the driving board 530) that is used for controlling the emission of the 4 RGB LEDs. The LED tuning circuit converts the lighting control signals into 12 current signals for individually controlling the RLED, the GLED and the BLED in each RGB LED, and transmits the current signals to each RGB LED, so as to control each RGB LED to emit light according to the color and brightness determined by the lighting control module.

FIG. 8 is a diagram showing details of the light source portion 560 of the lighting device 500 shown in FIG. 7. As shown in (a) and (b) of FIG. 8, the light source portion 560 includes the light source assembly 561 and the lens assembly 562. In the light source assembly 561, the four RGB LEDs are arranged at front, back, left and right positions (for example, central symmetry). The light source assembly 561 is arranged on an MCPCB. In the lens assembly 562, 4 lenses are respectively arranged directly above the 4 RGB LEDs, such that the light emitted from the corresponding RGB LEDs directly enters the lenses. The convex surface of each lens faces downward and the plane faces upward, such that the light passing through the lens is incident on a specified lighting area of the bulb shell (for example, a lighting area in the range of 45 degrees).

In addition, each lens is vertically placed (i.e., the inclination angle is 0), such that the light passing through the 4 lenses is distributed in the range of 160-180 degrees in total, and adjacent lighting areas are separated from each other or are partially overlapped with each other. For example, the overlapping area of the adjacent lighting areas does not exceed 20%, 10%, 5%, and so on. Therefore, the lighting area of each color transitions naturally, thereby realizing desired multi-color light with gradually changing brightness and color.

It should be noted that, the above-mentioned inclination angle of the lens and the angle range corresponding to the specified lighting area of the bulb shell into which the light passing through the lens is incident are only examples, and can be appropriately set according to the desired lighting range on the bulb shell of the lighting device and the number of LEDs (or sub-LEDs) in the light source assembly.

FIG. 10 is a schematic cross-sectional view showing the lighting device 500 shown in FIG. 7. As shown in FIG. 10, an audio chip MIC can be connected to the driving board 530 of the lighting device 500 through a PCB. The audio chip MIC is opened outward through the sound guide column to receive an external voice input, for example, a voice input of the user. The MIC can receive the external voice input through the sound guide column, and convert the received voice input into a voice control signal. The voice control signal then can be converted into a lighting control signal through an appropriate control module, so as to control each RGB LED to emit light.

Similar to the additional functions, such as emitting white illuminating light and realizing synchronous changes in the lighting color and brightness of the RGB LED with the music, that can be implement by the lighting device 400, same additional functions can be implemented by the lighting device 500, and thus no repeated description is given herein.

Apparently, the embodiments described above are merely a part, but not all, of the embodiments of the present application. All of other embodiments, obtained by those of ordinary skill in the art on the basis of the embodiments in the present application without any creative effort, fall into the protection scope of the present application.

It should be noted that, the terms used here are only for describing specific embodiments, and are not intended to limit the exemplary embodiments according to the present application. As used herein, unless the context clearly indicates otherwise, the singular form is also intended to include the plural form, and in addition, it should also be understood that, when the terms "comprising" and/or "including" are used in this specification, they indicate the presence of features, steps, works, devices, components, and/or combinations thereof.

It should be illustrated that, the terms "first" and "second" and the like in the specification and claims of the present application and the above-mentioned drawings are used for distinguishing similar objects, and are not necessarily used for describing a specific sequence or precedence order. It should be understood that the data used in this way can be interchanged under appropriate circumstances, so that the embodiments of the present application described herein can be implemented in a sequence other than those illustrated or described herein.

The foregoing descriptions are only preferred embodiments of the present application, and are not intended to limit the present application, and for those skilled in the art, the present application can have various modifications and changes. Any modifications, equivalent replacements, improvements and the like, made within the spirit and principle of the present application, shall all be included in the protection scope of the present application.

What we claim is:

1. A lighting control method for a light source having a plurality of LEDs, wherein the method comprises:
   acquiring the number N of LEDs and a control curve for controlling changes in brightness and color of the light emitted from each LED with a time t, the control curve defining the same brightness cycle and color cycle for each LED, wherein the brightness cycle indicates a brightness change period T of the LED and a brightness change curve of the change in brightness with the time t within each brightness change period, and the color cycle indicates a color change period T, the number M of color intervals and a color change curve of the change in color with the time t within each color change period, $M \geq 2$, and T'=MT;
   determining a time offset on the control curve according to the number N and the brightness change period T;
   acquiring a starting timing t1 of the first LED on the control curve, $0 \leq t1 < MT$;
   determining a starting timing tn of the nth LED on the control curve according to the starting timing t1 of the first LED and the time offset: tn=t1+offset×(n−1), n=2, 3, . . . , N, so as to determine the starting timing of each LED on the control curve, wherein $0 \leq tn < MT$, and the starting timings of the N LEDs are different from each other;
   determining, from the control curve, starting brightness and a starting color corresponding to the starting timing of each LED, based on the starting timing of each LED; and
   controlling each LED of the plurality of LEDs, beginning from the corresponding starting brightness and starting color, to emit light according to the brightness and color determined by the control curve,
   wherein within a brightness change period, the brightness first decreases linearly from the highest brightness to the lowest brightness, and then increases linearly from the lowest brightness until returning to the highest brightness, and
   within a color change period, the color gradually changes in the M color intervals, and the color that corresponds to the timing corresponding to the highest brightness on the control curve is a preset specific color.

2. The lighting control method according to claim 1, wherein the determining the time offset on the control curve comprises:

calculating an initial value of the offset according to offset=(min(N, M)−0.4)×T/(N−1); and adjusting the initial value of the offset according to the relationship between the calculated initial value of the offset and the brightness change period T, so as to derive a final value of the offset, such that the final value of the offset deviates from 0, 0.5T or 1T by more than 0.1T.

3. The lighting control method according to claim 2, wherein the adjusting the initial value of the offset according to the relationship between the calculated initial value of the offset and the brightness change period T, so as to derive the final value of the offset comprises:

determining whether the initial value of the offset is in an interval [0T, 0.2T], [0.4T, 0.5T], [0.5T, 0.6T], or [0.8T, 1.2T], and when it is determined that the initial value of the offset is in the interval [0T, 0.2T], deriving the final value of the offset as 0.2T;

when it is determined that the initial value of the offset is in the interval [0.4T, 0.5T], deriving the final value of the offset as 0.4T;

when it is determined that the initial value of the offset is in the interval [0.5T, 0.6T], deriving the final value of the offset as 0.6T;

when it is determined that the initial value of the offset is in the interval [0.8T, 1.2T], deriving the final value of the offset as 0.8T; and when it is determined that the initial value of the offset is not in the interval [0T, 0.2T], [0.4T, 0.5T], [0.5T, 0.6T] and [0.8T, 1.2T], deriving the final value of the offset as the calculated initial value of the offset.

4. The lighting control method according to claim 1, wherein the highest brightness is preset 100% brightness, and the lowest brightness is 0.

5. The lighting control method according to claim 4, wherein within the brightness change period during which the time t changes from 0 to T, in the brightness change curve, the brightness is the preset 100% brightness when t=0, then the brightness decreases linearly over time until it becomes 0 when t=T/2, and then the brightness increases linearly over time until it returns to the 100% brightness when t=T.

6. The lighting control method according to claim 1, wherein the gradual change means that when the color gradually changes from the interval of the current color to the interval of the next color, the purity of the current color decreases linearly, and at the same time, the purity of the next color increases linearly.

7. The lighting control method according to claim 6, wherein M=6, and the M color intervals are respectively: a red interval, an orange interval, a yellow interval, a cyan interval, a blue interval and a purple interval.

8. The lighting control method according to claim 7, wherein the preset specific color comprises M specific colors belonging to different color intervals from each other, each of the M specific colors is defined as a color with a purity of 100% in the color interval to which it belongs, and wherein within the color change period during which the time t changes from 0 to 6T, in the color change curve, the gradual change of the color in the M color intervals comprises:

the color is red with the purity of 100% when t=0, then the red with the purity of 100% gradually changes to orange until the color is orange with the purity of 100% when t=T, then the orange with the purity of 100% gradually changes to yellow until the color is yellow with the purity of 100% when t=2T, then the yellow with the purity of 100% gradually changes to cyan until the color is cyan with the purity of 100% when t=3T, then the cyan with the purity of 100% gradually changes to blue until the color is blue with the purity of 100% when t=4T, then the blue with the purity of 100% gradually changes to purple until the color is purple with the purity of 100% when t=5T, and then the purple with the purity of 100% gradually changes to red until the color returns to red with the purity of 100% when t=6T.

9. The lighting control method according to claim 1, wherein within a color change period, the color gradually changes in the M color intervals in the order of spectral wavelengths corresponding to the M color intervals from large to small or from small to large.

10. The lighting control method according to claim 1, wherein each LED comprises a plurality of sub-LEDs that are the same as each other, and at any timing, the lighting color and lighting brightness of the plurality of sub-LEDs in one LED are the same.

11. A lighting control device for a light source having a plurality of LEDs, wherein the lighting control device comprises:

an acquisition module, configured to:
  acquire the number N of LEDs and a control curve for controlling changes in brightness and color of the light emitted from each LED with a time t, the control curve defining the same brightness cycle and color cycle for each LED, wherein the brightness cycle indicates a brightness change period T of the LED and a brightness change curve of the change in brightness with the time t within each brightness change period, and the color cycle indicates a color change period T', the number M of color intervals and a color change curve of the change in color with the time t within each color change period, M ≥ 2, and T'=MT, and
  acquire a starting timing t1 of the first LED on the control curve, 0 ≤ t1<MT;

a determination module, configured to:
  determine a time offset on the control curve according to the number N and the brightness change period T from the acquisition module,
  determine the starting timing tn of the nth LED on the control curve according to the time offset and the starting timing t1 of the first LED from the acquisition module: tn=t1+offset×(n−1), n=2, 3, . . . , N, so as to determine the starting timing of each LED on the control curve, wherein 0 ≤ tn<MT, and the starting timings of the N LEDs are different from each other, and
  determine, from the control curve, starting brightness and a starting color corresponding to the starting timing of each LED, based on the starting timing of each LED; and a control module, configured to: control each LED of the plurality of LEDs, beginning from the corresponding starting brightness and starting color, to emit light according to the brightness and color determined by the control curve, wherein within a brightness change period, the brightness first decreases linearly from the highest brightness to the lowest brightness, and then increases linearly from the lowest brightness until returning to the highest brightness; and within a color change period, the color gradually changes in the M color intervals, and the color that corresponds to the timing corresponding to the highest brightness on the control curve is a preset specific color.

12. The lighting control device according to claim 11, wherein the determination module determining the time offset on the control curve comprises:
   calculating an initial value of the offset according to offset=(min(N, M)−0.4)×T/(N−1); and
   adjusting the initial value of the offset according to the relationship between the calculated initial value of the offset and the brightness change period T, so as to derive a final value of the offset, such that the final value of the offset deviates from 0, 0.5T or 1T by more than 0.1T.

13. The lighting control device according to claim 12, wherein the adjusting the initial value of the offset according to the relationship between the calculated initial value of the offset and the brightness change period T, so as to derive the final value of the offset comprises:
   determining whether the initial value of the offset is in an interval [0T, 0.2T], [0.4T, 0.5T], [0.5T, 0.6T], or [0.8T, 1.2T], and
   when it is determined that the initial value of the offset is in the interval [0T, 0.2T], deriving the final value of the offset as 0.2T;
   when it is determined that the initial value of the offset is in the interval [0.4T, 0.5T], deriving the final value of the offset as 0.4T;
   when it is determined that the initial value of the offset is in the interval [0.5T, 0.6T], deriving the final value of the offset as 0.6T;
   when it is determined that the initial value of the offset is in the interval [0.8T, 1.2T], deriving the final value of the offset as 0.8T; and
   when it is determined that the initial value of the offset is not in the interval [0T, 0.2T], [0.4T, 0.5T], [0.5T, 0.6T] and [0.8T, 1.2T], deriving the final value of the offset as the calculated initial value of the offset.

14. The lighting control device according to claim 11, wherein the highest brightness is preset 100% brightness, and the lowest brightness is 0.

15. The lighting control device according to claim 14, wherein within the brightness change period during which the time t changes from 0 to T, in the brightness change curve, the brightness is the preset 100% brightness when tom, then the brightness decreases linearly over time until it becomes 0 when t=T/2, and then the brightness increases linearly over time until it returns to the 100% brightness when t=T.

16. The lighting control device according to claim 11, wherein the gradual change means that when the color gradually changes from the interval of the current color to the interval of the next color, the purity of the current color decreases linearly, and at the same time, the purity of the next color increases linearly.

17. The lighting control device according to claim 11, wherein the spectral wavelengths corresponding to the M color intervals are continuous.

18. A lighting device, comprising:
   the lighting control device according to claim 11, and
   a light source having a plurality of LEDs.

19. The lighting device according to claim 18, wherein the light source comprises:
   a light source assembly, comprising the plurality of LEDs, and
   a lens assembly, comprising a plurality of lenses, and each of the plurality of lenses is located on a corresponding one of the plurality of LEDs.

20. The lighting device according to claim 19, wherein the lighting device further comprises:
   a bulb shell, configured to surround the light source and transmit the light emitted from the light source to the outside after diffuse reflection,
   wherein each lens transmits the light emitted from a corresponding LED to the outside through a corresponding lighting area on the bulb shell, and
   on the bulb shell, two adjacent lighting areas corresponding to two adjacent LEDs are separated from each other or are partially overlapped with each other.

21. The lighting device according to claim 18, wherein the lighting control device and the light source are integrated in a single housing or are arranged separately from each other.

22. The lighting device according to claim 18, wherein the lighting device is a single LED bulb.

* * * * *